(12) United States Patent
Bridon

(10) Patent No.: US 12,039,645 B1
(45) Date of Patent: Jul. 16, 2024

(54) EDGE CONTRIBUTION TECHNIQUES FOR VECTOR GRAPHICS RENDERING

(71) Applicant: Apple Inc., Cupertino, CA (US)

(72) Inventor: Jeremy G. Bridon, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 185 days.

(21) Appl. No.: 17/683,827

(22) Filed: Mar. 1, 2022

Related U.S. Application Data

(60) Provisional application No. 63/156,430, filed on Mar. 4, 2021.

(51) Int. Cl.
| | |
|---|---|
| *G06T 1/00* | (2006.01) |
| *G06T 11/20* | (2006.01) |
| *G06T 11/40* | (2006.01) |
| *G06T 11/60* | (2006.01) |
| *G06T 15/00* | (2011.01) |

(52) U.S. Cl.
CPC ............ *G06T 11/60* (2013.01); *G06T 11/203* (2013.01); *G06T 11/40* (2013.01); *G06T 15/005* (2013.01)

(58) Field of Classification Search
CPC ..... G06T 15/005; G06T 19/00; G06T 11/001; G06T 11/40; G06T 11/60
USPC .......................................................... 345/418
See application file for complete search history.

(56) References Cited

U.S. PATENT DOCUMENTS

| | | | | |
|---|---|---|---|---|
| 2014/0184591 A1* | 7/2014 | Boschker | ............. | G01C 21/367 345/419 |
| 2017/0287099 A1* | 10/2017 | Self | ........................... | G06T 1/00 |
| 2019/0045207 A1* | 2/2019 | Chen | ....................... | H04L 67/12 |
| 2021/0375044 A1* | 12/2021 | George | ................ | H04N 13/271 |
| 2022/0171893 A1* | 6/2022 | Ye | ........................... | G06T 17/20 |

OTHER PUBLICATIONS

Ganacim, Francisco, et al.; "Massively-Parallel Vector Graphics"; IMPA—Instituto Nacional de Matematica Pura e Aplicada; pp. 1-14; Nov. 2014.

* cited by examiner

*Primary Examiner* — Gordon G Liu
(74) *Attorney, Agent, or Firm* — Thompson Hine LLP

(57) ABSTRACT

Various implementations disclosed herein include devices, systems, and methods that render perspective correct 2D graphics. In some implementations, a vector graphic including portions defined on a 2D canvas is obtained, and tiles of the 2D canvas is divided into tiles. In some implementations, a subset of the portions outside of a first tile of the tiles on the 2D canvas is identified. Then, the portions of the subset are projected onto an edge of the first tile. In some implementations, data for rendering the vector graphic is provided, the data comprising the projected portions of the subset of the portions outside the first tile.

20 Claims, 15 Drawing Sheets

202

204

EDGE CONTRIBUTION TECHNIQUES FOR VECTOR GRAPHICS RENDERING

CROSS-REFERENCE TO RELATED APPLICATIONS

This application claims the benefit of U.S. Provisional Application Ser. No. 63/156,430 filed Mar. 4, 2021, which is incorporated herein in its entirety.

TECHNICAL FIELD

The present disclosure generally relates to electronic devices that render vector graphics and, in particular, to systems, methods, and devices that render perspective correct vector graphics in 3D environments.

BACKGROUND

Some rendering techniques for text and other graphics use fixed-resolution images (e.g., bitmaps). The appearance of such fixed-resolution images may be affected by operations that enlarge (e.g., zooming in) or reduce (e.g., zooming out) their sizes on a display. For example, the edges within such a fixed-resolution graphic may appear blurry as the image is enlarged. In contrast to fixed-resolution graphics, vector graphics define their appearances in ways that are not tied to a particular resolution (e.g., using lines, curves, or shapes specified by math formulas) that are less susceptible to being affected by operations that enlarge or reduce their sizes on a display. However, existing techniques for rendering vector graphics may use an undesirable amount of the electronic devices' resources (e.g., CPU and/or GPU computations, time, power, etc.).

SUMMARY

Various implementations disclosed herein include devices, systems, and methods that render a view of a vector graphic in a 3D environment. The vector graphic may be defined using a 2D canvas that may be displayed flat or warped within the 3D environment. The vector graphic may be defined based on vector graphics drawing commands that define one or more paths (e.g., lines, curves, or shapes specified by math formulas) and/or that specify the vector graphic's material visual properties (e.g., color, texture, etc.) In some implementations, a GPU shader is used to render an appearance of each pixel of the view of the vector graphic. In some implementations, efficient rendering is achieved by using a pre-processing stage to identify data about the vector graphic to improve the GPU shader's efficiency. For example, a CPU may determine representations of vector-graphic's portions (e.g., paths or path segments) that are relevant to (contribute to) each of multiple regions (e.g., tiles) subdivided from the 2D canvas. Using this data, the GPU can efficiently determine how to render a pixel by assessing only the relevant portions of the vector graphic based on which region the pixel is within. The GPU does not need to assess the other, non-relevant vector-graphic portions. In some implementations, the pre-processing stage reduces the number of curves used to represent the 2D vector graphic (e.g., drawn by the GPU).

In some implementations, simplifying representations of vector graphic portions involves identifying a subset of the portions of a vector graphic that occur outside a tile. For example, the subset of the portions occurs on one side (e.g., to the left) of the tile. In some implementations, portions of the subset are projected onto an edge of the tile. In some implementations, the projected portions of the subset positively or negatively combine to result in a single positive contribution or no contribution. For example, a circle to the left of a tile fully encloses itself and contributes nothing to the tile and thus need not be represented at all. As another example, a winding curve may have three sub-portions (two positive and one negative) that can be simplified as a single sub-portion that contributes once.

In general, one innovative aspect of the subject matter described in this specification can be embodied in methods that include the actions of obtaining a vector graphic including portions defined on a 2D canvas and dividing the 2D canvas into tiles. In some implementations, a subset of the portions outside of a first tile of the tiles on the 2D canvas is identified, and the portions of the subset are projected onto an edge of the first tile. Then, data for rendering the vector graphic is provided, the data including the projected portions of the subset of the portions outside the first tile.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
FIG. 1 illustrate examples of vector graphics.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that render vector graphics in a 3D environment that have an intended appearance (e.g., with sharp edges, without blur, etc.) at any angle and distance (e.g., perspective correct vector graphics). For example, these techniques allow users of an electronic device (e.g., head mounted device (HMD) to read text without seeing the blurriness of a texture-based equivalent (e.g., rasterized drawing commands to a texture).

In various implementations, a vector graphic is defined by vector graphic drawing commands (e.g., stroking, filling, drawing paths, blend operations, image drawing, etc.). In some implementations, a pre-processing technique is performed and then, the resulting data is provided to a graphics processor. In some implementations, a fragment shader of a GPU, paired with the processed data, renders the vector graphic on arbitrary geometry in every frame of a 3D scene. The GPU renders all paths (curves, lines, etc.) of the vector graphic in a pixel accurate way.

In some implementations, a vector graphic is defined using a 2D canvas and a pre-processing stage divides the 2D canvas into uniform tiles (e.g., regions of pixels). A processor, e.g., a CPU, evaluates each tile of the uniform tiles and first determines whether any of the drawing commands for the vector graphic are partially visible in the tile (e.g., colored by a path, stroke, image, etc. or not). In some implementations, the first check uses a bounding box technique to determine whether each drawing command for the vector graphic contributes to the tile. When a path of a drawing command intersects an edge of the tile (e.g., 4 edges of a rectangular tile), the path contributes to the tile and the tile is partially filled.

In some implementations, a second check to determine which portions (e.g., paths or path segments (e.g., curves)) of the vector graphic are relevant to each of a plurality of tiles sub-divided from the 2D canvas simplifies sub-portions of contributing portions that occur to the left of the tile. A relevant portion is simplified by combining sub-portions of the portion that are to the left of the tile and contribute multiple times (e.g., positively or negatively combine to result in a single positive contribution or no contribution). For example, a circle to the left of a tile fully encloses itself and contributes nothing to the tile and thus need not be represented at all. As another example, a winding curve may have three sub-portions (two positive and one negative) that can be simplified as a single sub-portion that contributes once.

In some implementations, determining which portions (e.g., paths or path segments (e.g., curves)) of the vector graphic are relevant to each of a plurality of tiles sub-divided from the 2D canvas projects each non-intersecting sub-portion (e.g., represented by a quadratic curve) of the portion that occurs to the left of the tile onto a left edge of the tile. For example, for each positive contribution, a positive span is added on the left edge of the tile, and for each negative contribution, a corresponding span on the left edge of the tile is subtracted. In some implementations, non-intersecting sub-portions (e.g., represented by a quadratic curve) of the portion that occurs to the left of the tile are projected onto the left edge of the tile until a final span list is determined to be a vertical 1D line or a plurality of vertical line segments that represent the contributing sub-portions. In some implementations, overlapping spans are either separated into sub-spans or merged, wherever appropriate. In some implementations, the vertical line or vertical line segments are represented by vertical line spans, which is representation that can be rendered by various scanline rendering techniques. Further, scanline rendering of intersections with vertical line spans is more efficient than scanline rendering of intersections with sub-portions (e.g., quadratic curves).

In some implementations, an additional check for each tile determines whether a path of each drawing command for the vector graphic fully covers (e.g., filled) or fully excludes (e.g., empty) the tile. In some implementations, the additional check uses another bounding box technique. Once a path (e.g., drawing command) is known to contribute to a tile, the path is simplified to a series of curves (e.g., quadratic curves). These curves, paired with their colors, are placed into a list for the respective tile. An array of these lists compiled from all tiles is used, e.g., by a processor such as a GPU, to draw the 2D vector graphic. In some implementations, the pre-processing stage reduces the number of curves used to represent the 2D graphic.

In some implementations, the array of lists is formatted for the 3D coordinate space of a GPU. The GPU's fragment shader draws the 3D vector graphic by processing (e.g., consuming) the formatted array of lists. For each fragment being drawn, the fragment shader determines which tile it is in, and executes a scan-line conversion algorithm (e.g., determines fill, coverage, and color for the corresponding pixels). In some implementations, the rendered vector graphic on a 2D plane in the 3D environment is further deformed in 3D space (e.g., 3D or visual effects).

FIG. 1 is a diagram that illustrates vector graphics examples. Vector graphics can be used to define the appearances of various things including, but not limited to, text strings, PDFs files, fonts, 2D graphics, virtual objects, emojis, etc. As shown in FIG. 1, example vector graphics include a text string 102, an object defined by a PDF file 104, and a 2D graphic 106 that is a tiger.svg vector graphic.

Various implementations disclosed herein include devices, systems, and methods that render perspective correct vector graphics on a 2D canvas in a 3D environment, for example, using an HMD. In some implementations, the 2D canvas is a part of a 2D plane, and the canvas includes all the drawing content for the vector graphic. In other words, the canvas is the 2D surface that is modified by one or more drawing commands that constitute the vector graphic. In some implementations, the canvas includes all paths or path segments (e.g., lines or curves defined by one or more polynomials, quadratic equations, or other formulaic definitions) and the corresponding visual material properties (e.g., color, visual effects, etc.) in the vector graphic. In some implementations, the 2D canvas can be warped in 3D (e.g., reflection, distortion, mirroring) to warp the displayed vector graphic in a 3D environment.

Figure 2:
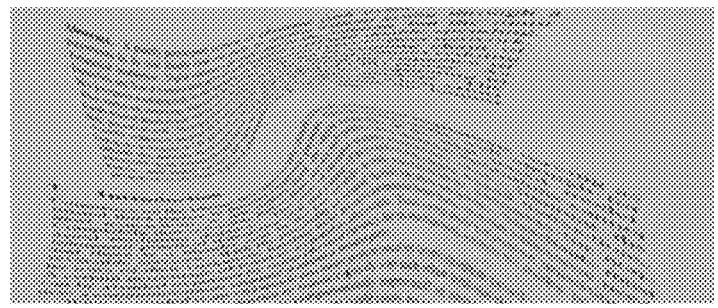
FIG. 2 illustrate an example of warping being applied to a rendered canvas including a vector graphic in accordance with some implementations.
Figure 2:

FIG. 2 is a diagram that illustrates an example of warping being applied to a rendered canvas including a vector graphic in accordance with some implementations. As shown in FIG. 2, examples of deforming include 3D effects such as distortion 202 of a 2D pdf document, or reflection and 3D warping 204 of a 2D pdf document. For example, the rendered warped vector graphic 204 is a virtual "paper", which appears physically correct when subsequently curled and folded.

In some implementations, pre-processing techniques described herein enable efficient rendering of vector graphic.

For example, the pre-processing techniques described herein may be used to reduce number of computations required to render the graphics and/or to reduce the number of curves used to represent the 2D vector graphic. The techniques may enable rendering vector graphics in real time (e.g., every frame) in a 3D environment. In some implementations, the pre-processing techniques are performed in a first processor (e.g., CPU) and the 2D canvas is rendered by a second processor (GPU) of one or more electronic devices. In some implementations, the pre-processing techniques implement a subdivision technique. In some implementations, the subdivision technique divides the canvas into a plurality of regions of pixels. In some implementations, the plurality of regions of pixels are uniformly shaped (e.g., rectangular). In some implementations, the subdivision technique divides the canvas into a plurality of uniformly shaped tiles of pixels. In one example, the tiles are all of the same size. Thus, each tile is a portion of the canvas.

In some implementations, the subdivision technique divides the canvas into the plurality of tiles based on a recursive subdivision. In some implementations, the tiles may be iteratively sub-divided. For example, the tiles may be iteratively sub-divided to a preset recursive depth (e.g., recursive depth of $2^7$), iteratively sub-divided until a prescribed condition is satisfied, or iteratively sub-divided until a recursive limit is reached (e.g., a maximum recursive depth). In some implementations, the prescribed condition is that it is unnecessary to subdivide the tile again. For example, a canvas may have 4 tiles or more than 5000 tiles.

In some implementations, one or more vector graphic drawing commands may be used to define or otherwise represent a vector graphic. In some implementations, the drawing commands that form a vector graphic are implemented using mathematical formulas such as polynomials. In one example, the drawing commands form shapes or portions of shapes in the vector graphic that are represented by arbitrary Bezier curves. In another example the drawing commands could form shapes represented by points, lines, cubics, quadratics, etc.

Figure 3:
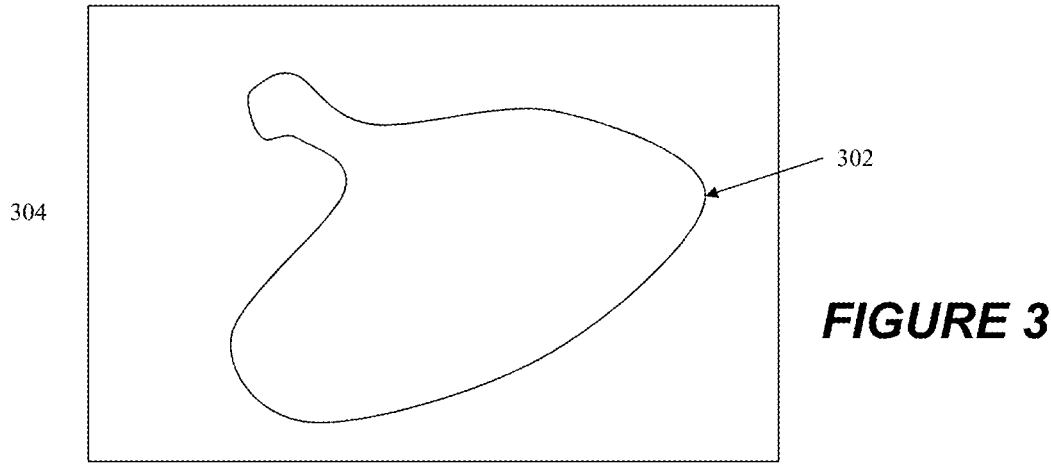
FIGS. 3-4 illustrate an example subdivision technique for a canvas in accordance with some implementations.
Figure 4:
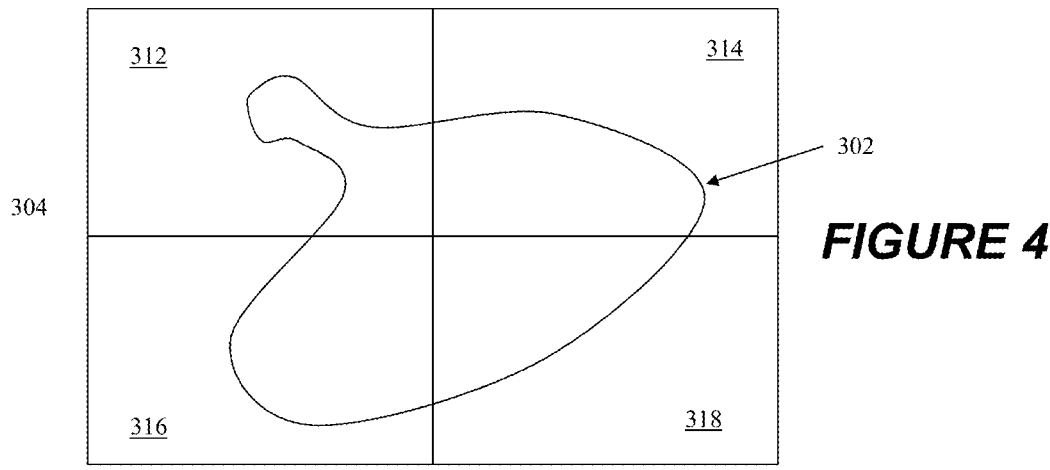

FIGS. 3-4 illustrate an example subdivision technique for a canvas in accordance with some implementations. As shown in FIG. 3, a canvas 304 includes a shape 302 as the vector graphic or part of the vector graphic. The shape 302 is formed by executing a series of drawing commands. As shown in FIG. 4, the canvas 304 is divided into 4 tiles 312, 314, 316, 318.

In some implementations, the subdivision technique evaluates the drawing commands that form a vector graphic, and determines what subset of the drawing commands contribute to each tile (e.g., a path in the vector graphic formed by the drawing command intersects or contains the tile) of the corresponding canvas. Then, a tile representation is generated that represents the paths and corresponding color of each contributing drawing command (e.g., represent all contributions to a tile). The combination of all tile representations for the canvas becomes the representation used to efficiently draw the canvas at the frame rate of a 3D environment.

As shown in FIG. 4, the subdivision technique determines the individual contribution of each path across each of the tiles 312, 314, 316, 318 that forms the shape 302. In some implementations, initially a state of each tile in a canvas is determined. In some implementations, the state of a tile includes empty (e.g., no paths), full (e.g., completely within a path), or partial (e.g., at least one intersection with the shape 302). As shown in FIG. 4, each of the tiles 312, 314, 316, 318 have a state of partial.

Figure 5A:
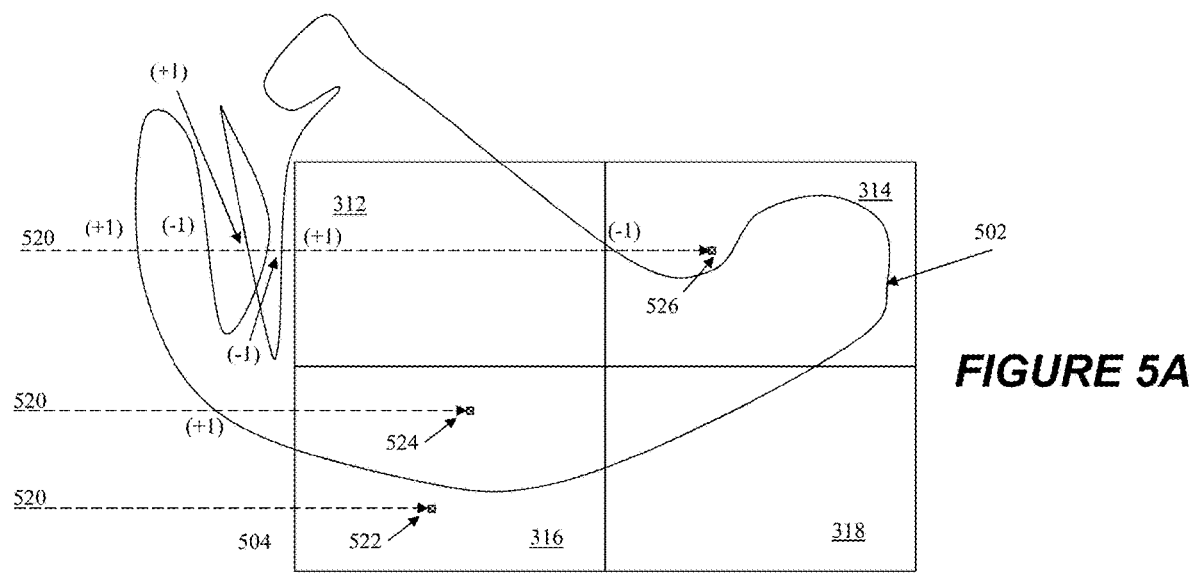
FIGS. 5A, 5B, 5C, and 6 illustrate another example subdivision technique for a canvas in accordance with some implementations.
Figure 5B:
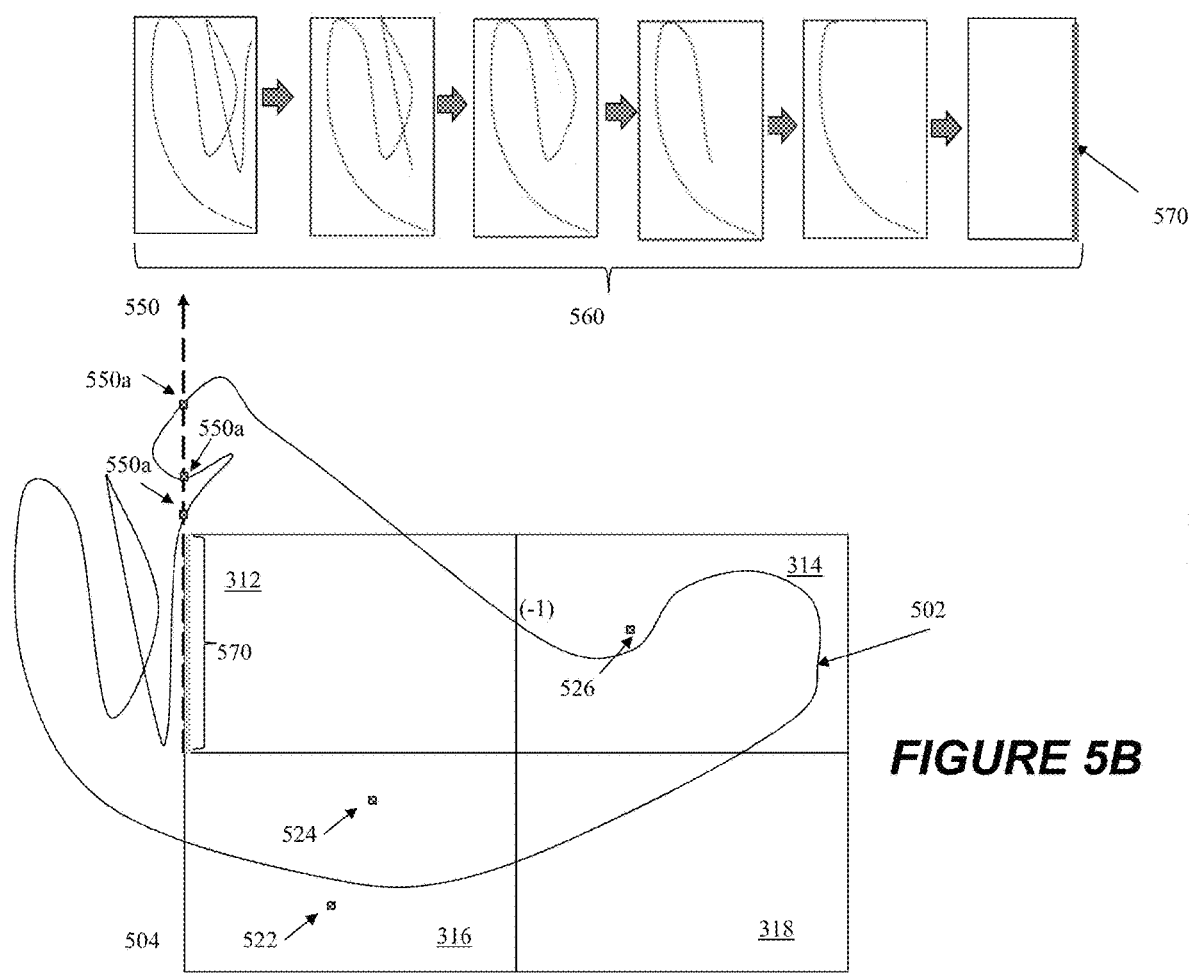
Figure 5C:
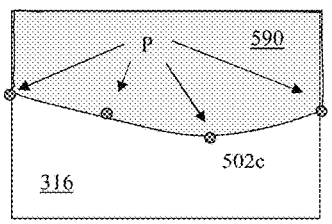
Figure 5C:
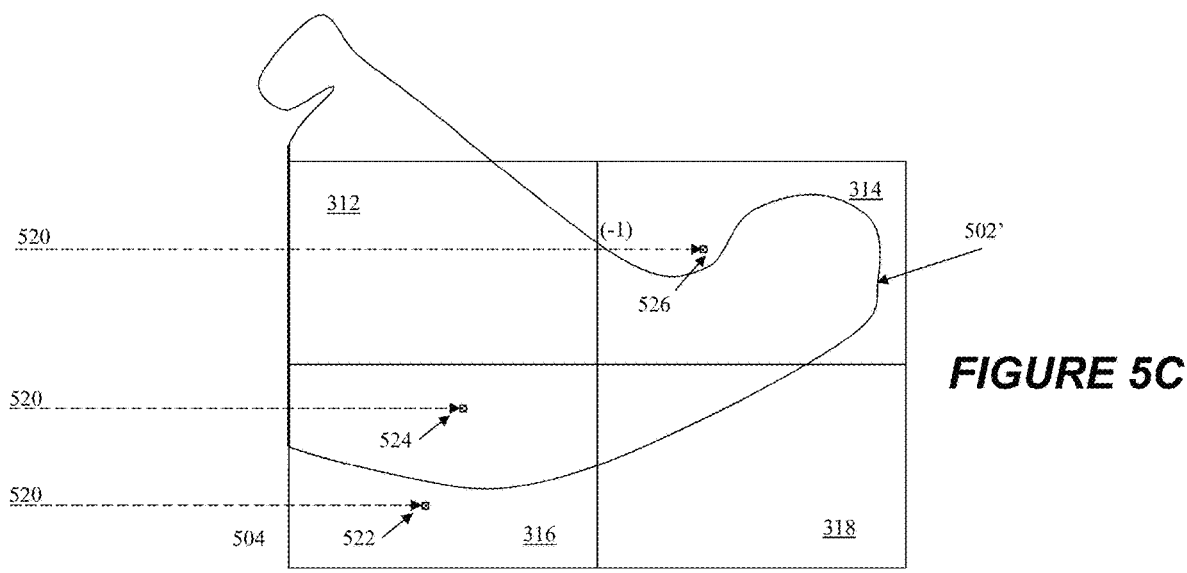

FIGS. 5A-5C illustrate another example subdivision technique for a canvas in accordance with some implementations. FIG. 5A illustrates tiles in a canvas 504 that includes a shape 502 as the vector graphic. As shown in FIG. 5A, each of the tiles 312, 314, 316, 318 has a state of partial.

In some implementations, the GPU uses a left-to-right scanline conversion. Accordingly, for each pixel in the canvas 504, the subdivision technique may further determine whether the pixel is colored or not (e.g., by the shape 502). In some implementations, the state of the pixel is determined by the winding rule. In some implementations, for each pixel in each tile, the winding rule shoots a ray 520 from the infinite left or the left edge of the canvas 504 to the pixel. Then, the winding rule counts the number of positive intersections and negative intersections of the ray 520 with the shape 502. In some implementations, when the intersection count of the ray 520 for a terminating pixel totals 0, the terminating pixel is not filled. Otherwise, the terminating pixel is filled. In some implementations, each intersection's contribution is determined to be positive or negative based on the tangent at the intersection with the shape 502 (e.g., polygon).

As shown in FIG. 5A, a pixel 522 has no intersections, which totals to 0, and the pixel 522 is empty. A pixel 524 has one positive intersection (e.g., +1) and the pixel 524 is filled or colored by the shape 502. A pixel 526 has 3 positive intersections (e.g., +1) and 3 negative intersections (e.g., −1), which totals to a 0 intersection count, and the pixel is not colored by the shape 502.

Since the tile 312 has the state of partial, portions of the shape 502 that contribute to the tile 312 need to be determined. Further, the winding rule uses intersections between the ray 520 and the shape 502 to determine when pixels of the tile 312 are to be colored (e.g., contained within the shape 502), and portions of the shape 502 to the left of the tile 312 need to be encoded by quadratics, represented by mathematical formulas, or at least tracked, which increases the complexity of the pre-processing stage or subdivision techniques.

Accordingly, in some implementations, the subdivision technique generates additional information about each tile of the canvas. In some implementations, the subdivision technique generates an additional ray for all tiles of the canvas. In some implementations, a vertical ray 550 is generated from the bottom left corner of each tile 312, 314, 316, 318 to the infinite top or the top of the canvas 504. In FIG. 5B, the ray 550 is only illustrated for the tile 312. In some implementations, the additional ray 550 is used to identify a collection of vertical intersections 550a between the ray 550 and the shape 502. In some implementations, the collection of vertical intersections 550a are used to reduce the complexity of the shape 502 for the tile 312.

In some implementations the ray 550 is used to project the portions of the shape 502 that occur to the left of the tile 312 onto the left vertical edge of the tile 312 (e.g., project portions of the shape 502 in at least 1 direction onto the tile 312). As shown in FIG. 5B, there are 3 intersections 550a and the first intersection 550a occurs above a top left corner of the tile 312. Accordingly, as shown in FIG. 5B, the portions of the shape 502 to the left of the tile 312 project 560 to a single continuous 1D line 570 along the left vertical edge of the tile 312. As shown in FIG. 5C, the single continuous 1D line along the left vertical edge of the tile 312 and the tile 316 is used to form the simplified or less complex shape 502'. In some implementations, instead of encoding representations for all portions of the shape 502, a 1D line on the left edge of corresponding tiles is used to represent more than one portion of the shape 502 drawn to the left of the corresponding tiles.

In some implementations, the protecting rule projects each non-intersecting portions of the shape 502 (e.g., quadratic curves of the shape 502) that exists to the left of each tile (e.g., the left vertical edge of the tile 312) in a horizontal direction to the right. In some implementations, for each positive contribution, a positive span is added on the tile's left edge (e.g., the left vertical edge of the tile 312). Then, for each negative contribution, that positive span is subtracted on the tile's left edge (e.g., the left vertical edge of the tile 312). These projections are repeated until a final span list (e.g., a collection of regions on the left edge of the tile 312) determine whether the portions of the shape to the left of each of the tiles contribute or do not contribute. For example, the projections are repeated until all portions of the shape 502 to the left of the tile 312 have been projected to the left vertical edge of the tile 312.

In some implementations, the final span list is converted into vertical line spans that separately occur along the left vertical edge of the tiles (e.g., tile 312). In some implementations, the final span list is used to generate a vertical edge list. In some implementations, two spans might overlap, and overlapping spans are either cut into sub-spans or merged, wherever appropriate according to visual material properties (e.g., color, etc.).

FIG. 5C illustrates a simplified shape 502' that may be formed by applying the projection rule to the shape 502 in the canvas 504. In some implementations, the winding rule may be applied to the simplified shape 502'. As shown in FIG. 5C, the pixel 522 has no intersections, which totals to 0, and the pixel 522 is empty. The pixel 524 has one positive intersection (e.g., +1) and the pixel 524 is filled or colored by the shape 502'. The pixel 526 has 1 positive intersection (e.g., +1) and 1 negative intersection (e.g., -1), which totals to a 0 intersection count, and the pixel 526 is not colored by the shape 502'.

In some implementations, the subdivision technique further determines which curves (e.g., a number of curves and how to represent each using a quadratic) determine a path across each tile of a canvas. For example, as shown in FIG. 5C, only a portion 502c of a path that forms the shape 502' (e.g., 502) crosses the tile 316 and is provided to the GPU as part of the closed curve 590 to draw pixels represented by the tile 316 of the canvas 504. For example, the portion 502c may be represented by only 3 curves between the four points P.

Figure 6:
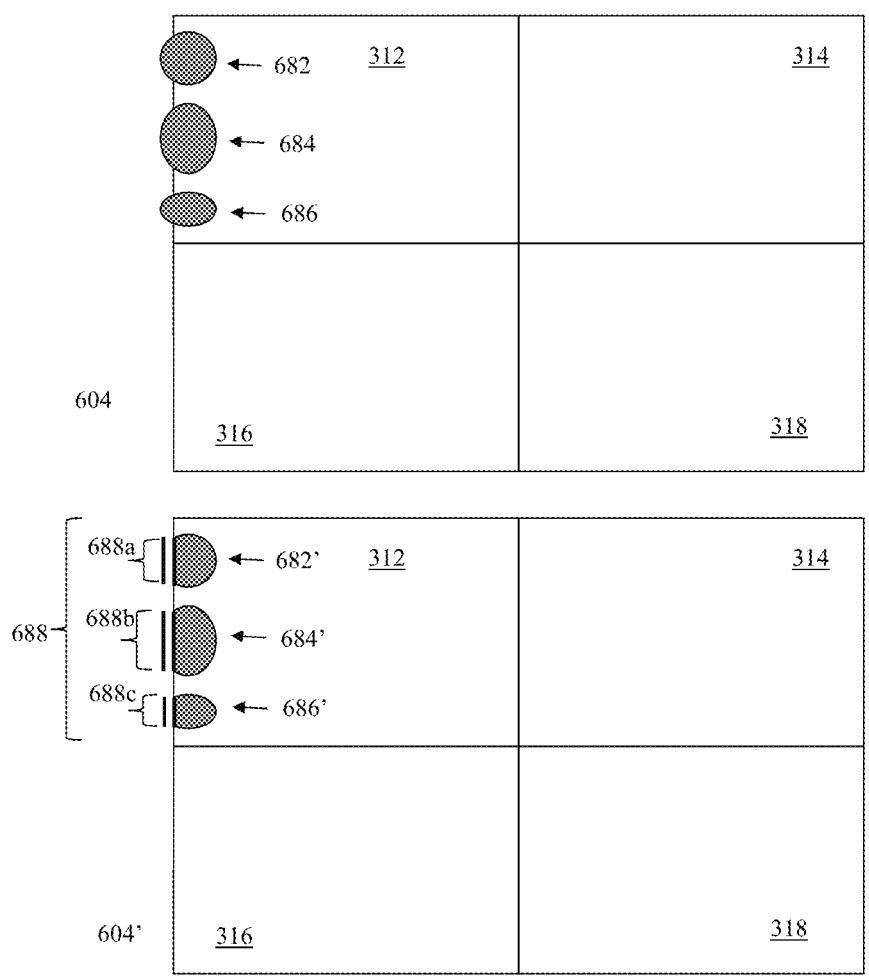

FIG. 6 illustrates tiles in a canvas 604 that includes a plurality of shapes 682, 684, 686 as the vector graphic before and a canvas 604' that includes a plurality of shapes 682', 684', 686' after the projection rule has been applied in accordance with some implementations. For example, a vertical edge list 688 that includes vertical edges 688a, 688b, and 688c is formed by applying the projection rule to the tile 312 in the canvas 604 As shown in FIG. 6, only the tile 312 has a state of partial. Further, only the closed shapes 682', 684', 686' contribute to the tile 312 and need a representation thereof generated to form the complete representation of the tile 312. In some implementations, the projecting rule successfully operates on a plurality of vector graphic drawing commands for tiles of a canvas.

In some implementations of the subdivision techniques, the projection rule is used first to simplify paths that from a shape such as the shape 502. Then, additional techniques or rules of the subdivision techniques are implemented. In some implementations, performing the projection rule first to simplify shapes generated by drawing commands of a vector graphic yielded up to a 20% efficiency gain in rendering vector graphics.

Figure 7:
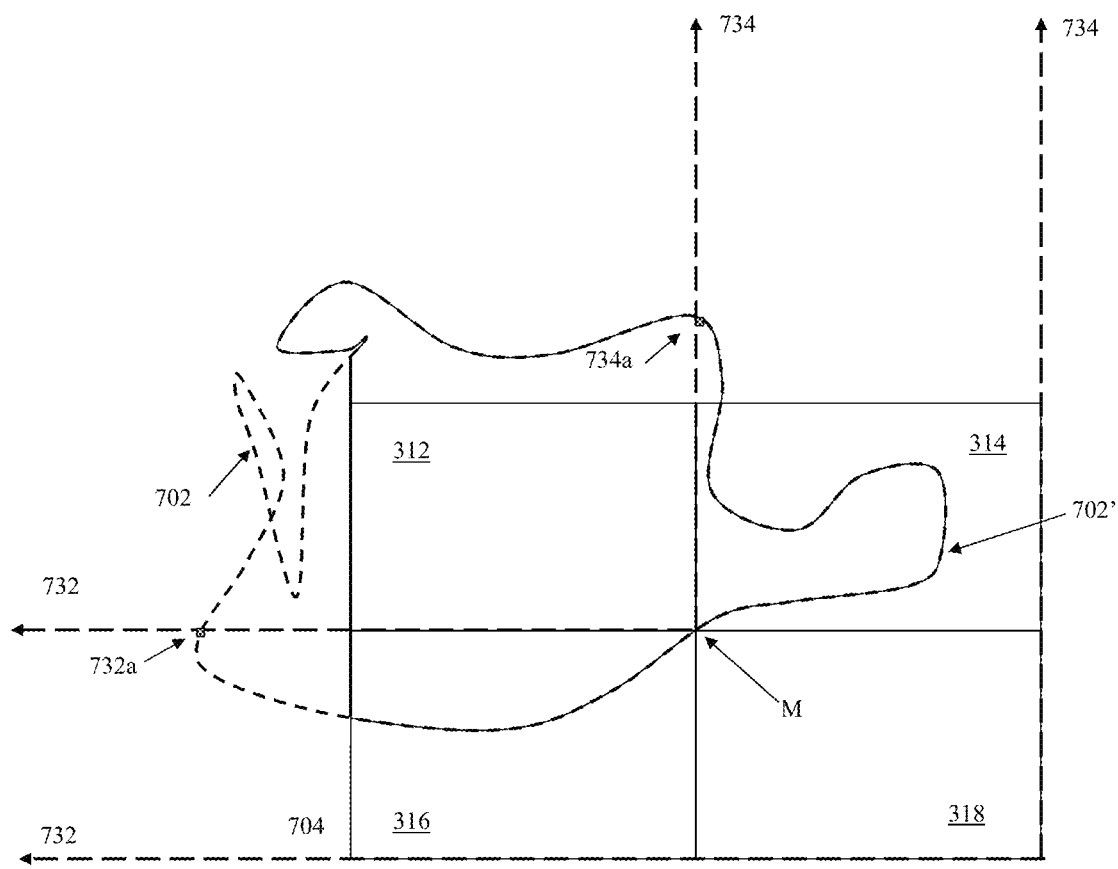
FIGS. 7-9 illustrate yet another example subdivision technique for a canvas in accordance with some implementations.
Figure 8:
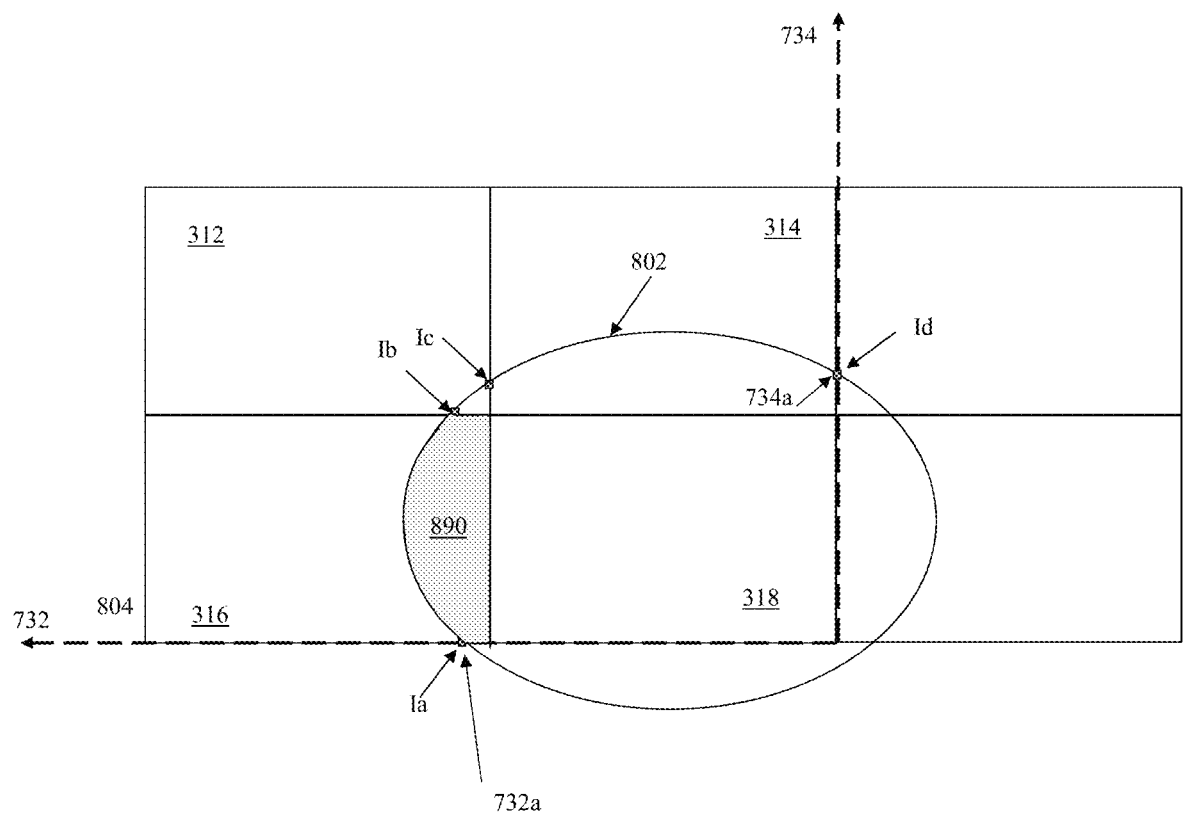
Figure 9:
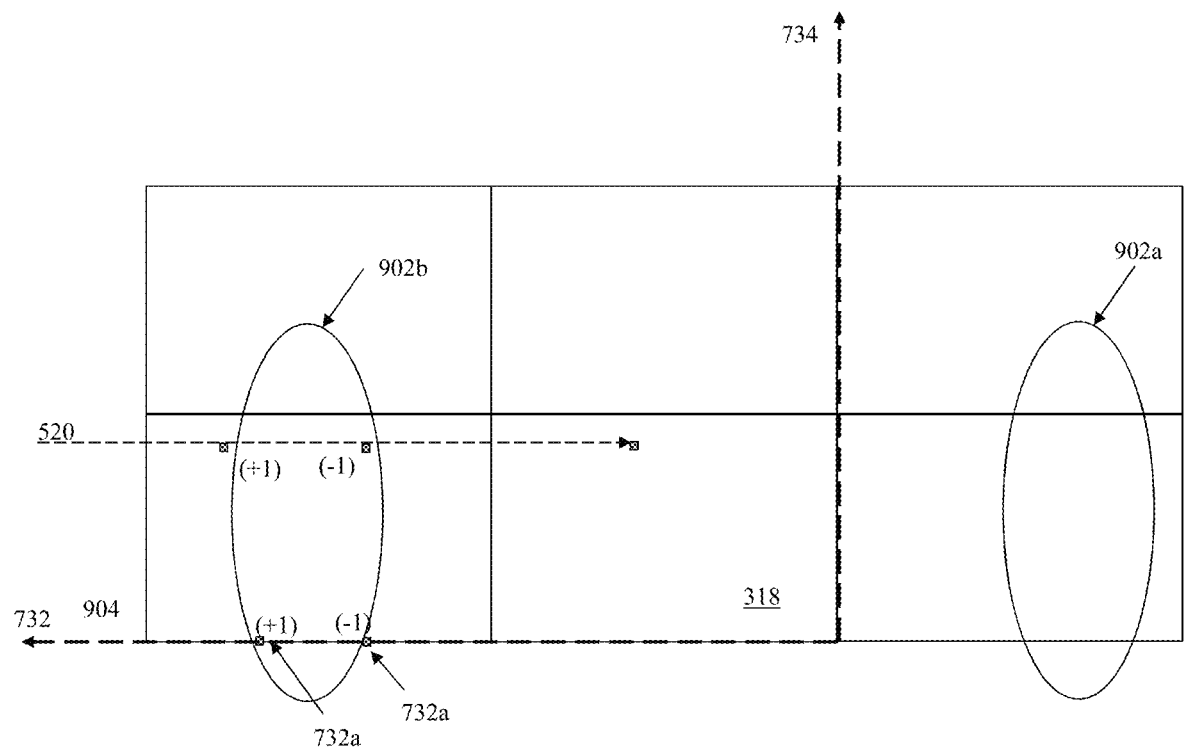

FIGS. 7-9 illustrate yet another example subdivision technique for tiles in a canvas in accordance with some implementations. As shown in FIG. 7, the tile 312 has a state of full, the tiles 312, 316 have a state of partial, and the tile 318 has a state of empty with respect to the shape 702 (e.g., using the assumption that the middle pixel does not contribute to tile 318). As shown in FIG. 7, a shape 702' (dashed lines) is a less complex version of the shape 702 in accordance with some implementations of subdivision techniques described herein.

In some implementations, the subdivision technique generates additional information about each tile of the canvas. In some implementations, the subdivision division technique generates two additional rays for all tiles of the canvas. In some implementations, a horizontal ray 732 is generated for the bottom right corner of each tile 312, 314, 316, 318, and a vertical ray 734 is generated for the bottom right corner of each tile 312, 314, 316, 318 of a canvas 704. In FIG. 7, the ray 732 and the ray 734 are only illustrated for the tiles 312, 318. On the assumption that a middle pixel M is covered by the shape 702 (e.g., 702') for the tile 312, the ray 732 and the ray 734 generate two additional intersections 732a, 734a and determine the state of the tile 312 is full. On the assumption that a middle pixel M is not covered by the shape 702 for the tile 318, the ray 732 and the ray 734 generate no additional intersections 732a, 734a and determine the state of the tile 318 is empty.

FIG. 8 illustrates tiles of a canvas 804 that includes a shape 802 as the vector graphic. As shown in FIG. 8, the tile 318 has a state of full, the tiles 312, 314, 316 have a state of partial because the edges of each tile have 2 intersections Ia, Ib, Ic, Id with the shape 802. For the tile 318, the ray 732 and the ray 734 generate intersections 732a, 734a and determine the state of the tile 312 is full.

FIG. 9 illustrates some tiles of a canvas 904 that includes a shapes 902a and 902b as the vector graphic. As shown in FIG. 9 for the tile 318, the ray 732 generate positive intersection 732a and a negative intersection 732a determines the shape 902b does not contribute to the tile 318. The subdivision technique determines the shape 902b exists to the left of the tile 318, does not contribute to the tile 318, and can be ignored when determining a representation for the tile 318. Further, when each pixel in the tile 318 is evaluated to see whether they are filled, each pixel in the tile 318 determines the shape 902b does not color the pixel because the ray 520 determines a 0 intersection count (e.g., no contribution). In addition, the shape 902a is not considered when evaluating the tile 318 because the shape 902a is completely to the right of the tile 318. Accordingly, the subdivision technique does not add any part of the shape 902a as relevant to the tile 318.

As described in FIGS. 5A-9, the subdivision techniques can use various orientations based on a direction of scanline rendering by the GPU. Further, different directions around or along the shape can be evaluated (e.g., clockwise or counterclockwise, right to left) with respect to determining the tangent of an intersection. In addition, alternate directions (e.g., initiating pixel to the left, top, or bottom edge of the canvas) may be used when evaluating intersections with drawing commands of vector graphics using the ray 520. Similarly, alternate directions or alternate edges may be used when evaluating intersections with drawing commands of vector graphics using the rays 732, and 734, respectively. In some implementations, all possible contributions by a drawing command of a plurality of drawing commands used to render a vector graphic that are to the right of each tile of a plurality of tiles in a canvas could be evaluated. Alternatively, the direction used to resolve all possible contributions by a drawing command may be switched (e.g., depending a side that has the least complex possible contributions).

The subdivision technique (e.g., pre-processing) operates to determine a list of relevant drawing commands (e.g., only the drawing commands for paths that contribute to each tile and then only the portions of the paths that crossed the tile). In some implementations, the subdivision technique enables the preprocessing stage to determine and transmit a reduced amount of data to the GPU to render the vector graphic. As shown in FIG. 8 for example, the subdivision technique only looks for all paths crossing the tile 316 between edge intersection Ia and edge intersection Ib, and then adds the arc (e.g., 1 curve) between Ia and Ib to the representation for the tile 316 (e.g., the arc and the 3 lines that complete the closed curve 890 that is transmitted to the GPU to render the shape 802 for the tile 316).

In some implementations, the subdivision technique transmits a data structure that is a series of drawing commands to a processor (e.g., GPU) to render the canvas in a 3D environment. In some implementations, the data structure includes movement commands for each shape and corresponding material properties that form the vector graphic on the canvas. For example, to draw a red shiny box, the data structure includes a move-to point command (e.g., move to the origin corner of the box), a first line-to command (e.g., draw a line to the second corner of the box), a second line-to command (e.g., draw a line to the third corner of the box), a third line-to command (e.g., draw a line to the fourth corner of the box), a fourth line-to command (e.g., draw a line to the origin corner of the box from the fourth corner), and an end path command, paired with material properties of red and shiny. In this example, the box is drawn with six commands and corresponding metadata to define the material properties.

In some implementations, the GPU uses the mathematical form of 3D UV coordinate space, and the data structure transmitted by the subdivision techniques is converted appropriately. For example, a tile in the canvas may be converted to a range of UV coordinate space (e.g., UV coordinates 000 to 256).

In some implementations, the GPU shader renders the vector graphic by processing the transmitted data structure. In some implementations, the GPU shader renders pixels forming the vector graphic by determining (i) what tile contained a pixel, (ii) what drawing commands (e.g., paths) are relevant to this tile, and then determine coverage (e.g., a percentage of the pixel (that has a specific color or material property), color, and composition (e.g., blending partially covered pixels or visual effects of rendered pixels) for the current pixel. Then, the GPU shader repeats the process for the remaining pixels that form the vector graphic.

In some implementations, the subdivision techniques operate as a preprocessing technique for rendering vector graphics that reduces the time or processing required to render the vector graphics in a 3D environment. Thus, without the subdivision techniques, the GPU would have to evaluate more paths, which incurs more processing for each tile and increases the time necessary to rendering the vector graphics in the 3D environment. However, the scanline rendering by the GPU can process a limited number of drawing commands and still be able to redraw the vector graphics in the 3D environment in real time (e.g., in every frame). In some implementations, because the user of an HMD moves their head or eyes a tiny amount all the time (e.g., even when holding still) vector graphics in a 3D environment need to be rendered in every frame to compensate for such user movement.

In some implementations, the canvas (e.g., vector graphics) is rendered for each frame displayed in a 3D environment. However, the subdivision techniques are performed only when the content of the canvas is changed. In other words, the subdivision techniques are processed only once for each non-mutated canvas. For example, for a fixed PDF vector graphic, the subdivision techniques are performed only once for the same document, but the PDF vector graphic is re-rendered in every frame of the 3D environment. In some implementations, only the relevant pixels in the canvas are rendered with each frame. For example, only the pixels in the canvas that change are updated. In some implementations, the pixels that change in the canvas are identified by comparing the canvas for the next frame with the canvas for the current frame.

In some alternate implementations, the vector graphics are not rendered with each frame in the 3D environment when certain conditions are satisfied. In these implementations, when the frame-to-frame changes (e.g., changes between sequential frames) to the vector graphics are not perceptible to the viewer, the vector graphics can be displayed as a single non-changing image (e.g., a texture drawn by the GPU). For example, the frame-to-frame changes for the vector graphics may not be perceptible when the vector graphic is displayed far away from the viewer (e.g., more than 1 m or 2 m) or the vector graphic visual quality is low.

Figure 10:
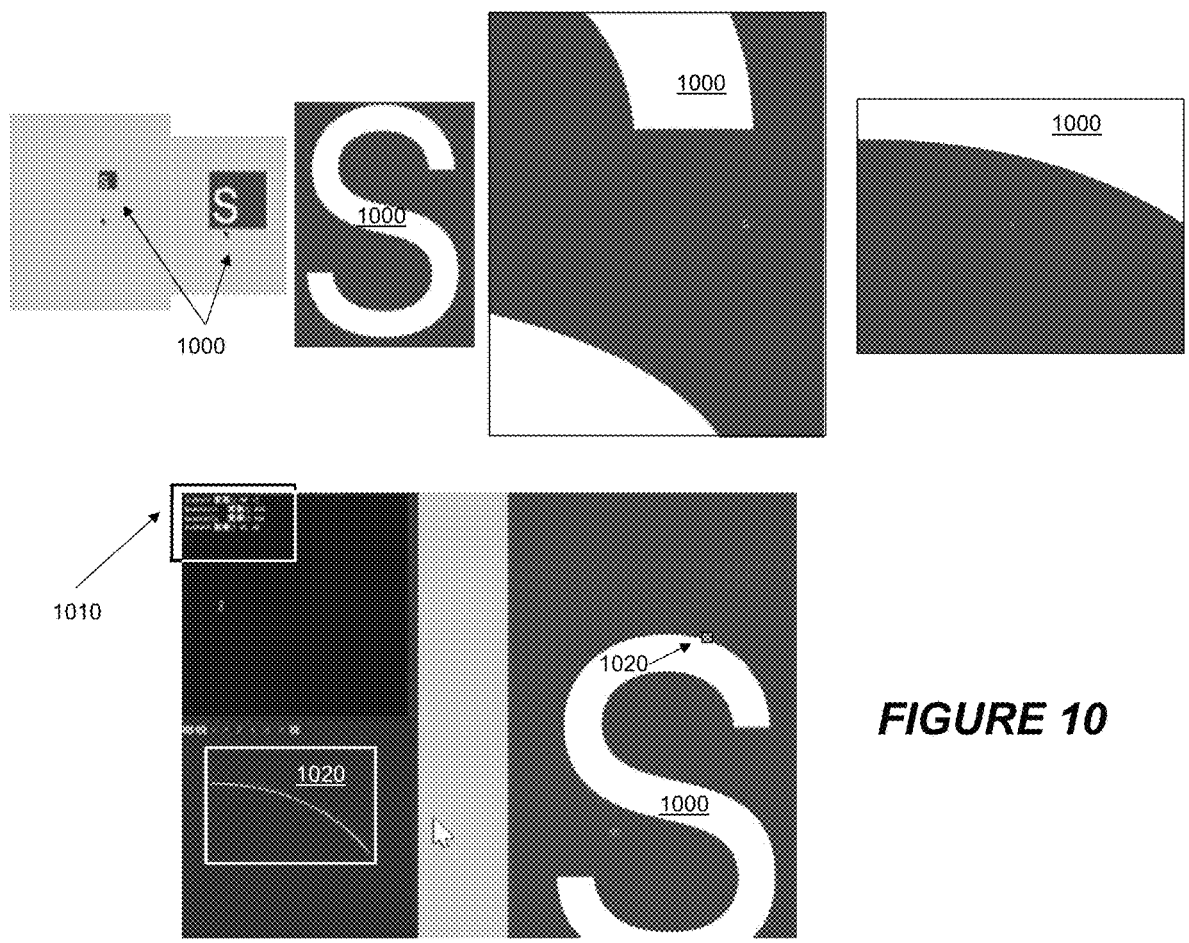
FIG. 10 illustrates a vector graphic drawn multiple times with only its size attribute changed in accordance with some implementations.

FIG. 10 illustrates a vector graphic drawn multiple times with only its size attribute changed in accordance with some implementations. As shown in FIG. 10, a perspective correct vector graphic 1000 that is a text letter "s" remains clear, with crisp edges, and accurate when rendered at 5 different sizes. FIG. 10 also illustrates an exemplary representation for a portion of a vector graphic in accordance with some implementations. As shown in FIG. 10, drawing commands 1010 for a portion 1020 of the rendered perspective correct vector graphic 1000 include move to commands and corresponding material properties.

Figure 11:
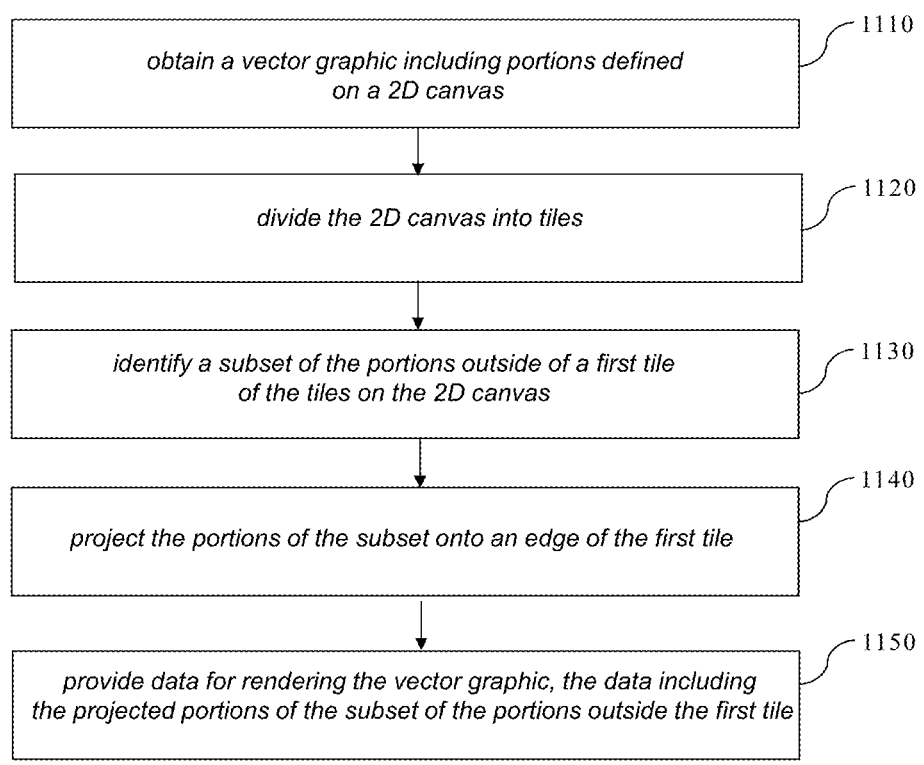
FIG. 11 is a flowchart illustrating an exemplary method of rendering a vector graphic by simplifying the vector-graphic data in accordance with some implementations.

FIG. 11 is a flowchart illustrating an exemplary method of rendering a vector graphic by simplifying the vector-graphic data. In some implementations, simplifying involves a projection process. The vector graphic may be defined using a 2D canvas that may be displayed flat or warped within a 3D environment. The 2D canvas may be divided into a plurality of tiles. In some implementations, the projection process identifies portions of the vector graphic outside of a tile, and projects those portions onto an edge of the tile to provide a simpler representation of the portions of the vector graphic that are relevant to rendering the tile. The rendering process uses the simpler representation and thus need not assess loops, twists, and complicated line segments that would otherwise need to be assessed. In some implementations, multiple non-intersecting paths of a portion that are to the left of a first tile are projected and contribute positively or contribute negatively and are combined to result in a single positive contribution or no contribution.

Figure 12:
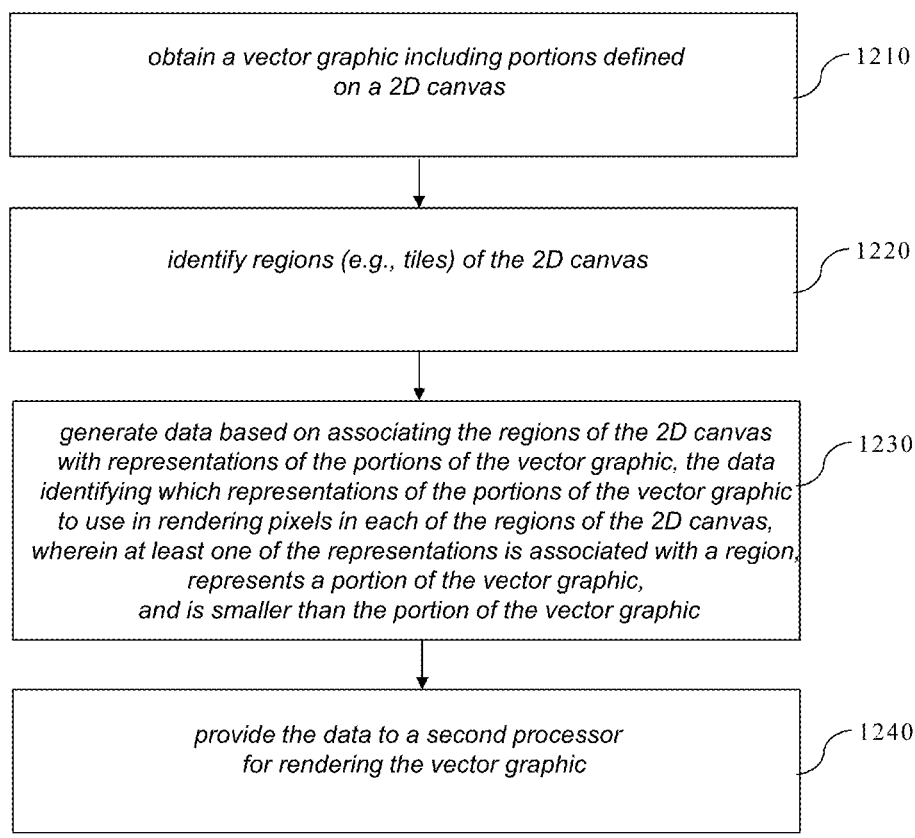
FIG. 12 is a flowchart illustrating an exemplary method of rendering a view of a vector graphic in a 3D environment in accordance with some implementations.
Figure 13:
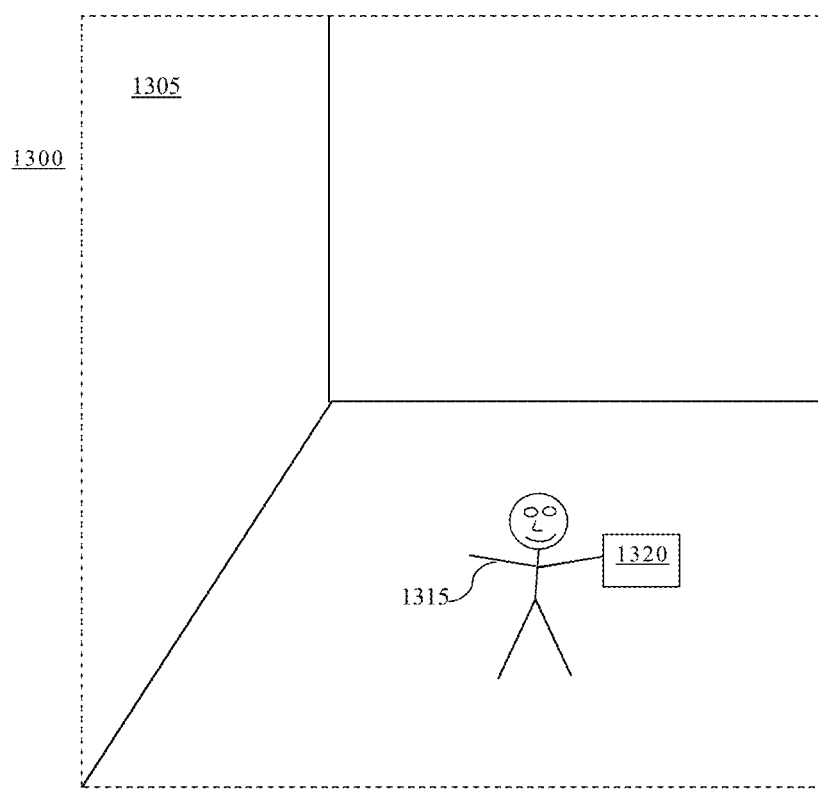
FIG. 13 illustrates an example operating environment in accordance with some implementations.

In some implementations, the method 1100 is performed by a device (e.g., electronic device 1220, 1200 of FIGS. 12 and 13). The method 1100 can be performed using an electronic device or by multiple devices in communication with one another. In some implementations, the method 1100 is performed by processing logic, including hardware, firmware, software, or a combination thereof. In some implementations, the method 1100 is performed by a processor executing code stored in a non-transitory computer-readable medium (e.g., a memory). In some implementations, the method 1100 is performed by an electronic device having a processor.

At block 1110, the method 1100 obtains a vector graphic including portions defined on a 2D canvas. In some implementations, vector graphics include text, or other graphics such as a drawing or pdf. In some implementations, the 2D canvas includes all the drawing content for the vector graphic (see for example, canvas 304 in FIG. 3). In other words, the canvas is a part of a 2D plane that is affected by drawing commands that make the vector graphic. In some implementations, the portions are all paths or path segments (e.g., polynomials, quadratic equations, or curves) and the corresponding visual material properties (e.g., color, visual effects, etc.) defined on the 2D canvas.

At block 1120, the method 1100 divides the 2D canvas into tiles. In some implementations, the 2D canvas is divided into uniformly shaped tiles. In some implementations, the tiles are the same size (see for example, tiles 312-318 in FIG. 4). In some implementations, the tiles may be iteratively sub-divided. For example, the tiles may be iteratively sub-divided to a preset recursive depth (e.g., recursive depth of 7). In another example, the tiles may be iteratively sub-divided until a condition is satisfied or until a recursive limit is reached. In some implementations, the 2D canvas is divided into separate regions, each region containing a plurality of pixels. In some implementations, the regions of the 2D canvas are identified in a pre-processing stage.

At block 1130, the method identifies a subset of the portions outside of a first tile of the tiles on the 2D canvas. In some implementations, the subset of the portions to the left of the first tile are identified. In one example, the subset of the portions includes non-intersecting paths appearing to the left of the tile of a portion that intersects the first tile. See for example, a subset of the portions of the shape 502, which intersects tiles 312 and 316, that are outside the tiles 312 and 316 as shown in FIG. 5A.

At block 1140, the method 1100 projects the portions of the subset onto an edge of the first tile. In some implementations, the portions of the subset are projected from at least one direction (e.g., horizontally to the right) onto an edge (e.g., left edge) of the first tile. For example, the portions of the subset are projected onto a left vertical edge. See for example, portions of the subset of the shape 502 to the left of the tile 312 are projected (560) onto a left vertical edge of the tile 312 and form a vertical span (1D line 570) as shown in FIG. 5B. In some implementations, projecting the portions of the subset onto an edge of the first tile simplifies a representation of the subset of the portions outside the first tile. In some implementations, positive contributions and negative contributions of the projected portions of the subset are combined to determine an edge list identifying vertical spans on the left vertical edge of the first tile. Combining the positive contributions and negative contributions of the projected portions of the subset may involve projecting multiple portions onto the same left vertical edge and cancelling out the overlapping projections to generate a single span along the left vertical edge. In some implementations, overlapping spans from different projections are separated into different sub-spans or merged.

At block 1150, the method 1100 provides data for rendering the vector graphic, the data including the projected portions of the subset of the portions outside the first tile. The data is provided to a processor (e.g., GPU) for rendering the vector graphic in a 3D environment (see for example, block 1240). In some implementations, the data is used to determine whether pixels within the first tile correspond to the interior of the vector graphic (e.g., contained within the vector graphic). See for example, the pixels 522, 524, 526 in FIG. 5C. The data for pixels of the first tile contained in the vector graphic identifies the color/texture to use for the pixels. See for example, the closed curve 590 used to draw pixels represented by the tile 316 of the canvas 504 for the shape 502. In some implementations, the data includes the state of each of the tiles of the 2D canvas (see for example, block 1230). In some implementations, the data determines each of the portions that intersect an edge of the tiles of the 2D canvas (see for example, block 1230).

In some implementations, blocks 1110-1150 are performed by a central processing unit (CPU). In some implementations, the techniques disclosed herein may be implemented on an HMD that provides an optical-see through view or a video pass-through view of a surrounding physical environment.

In some implementations, to determine which vector graphic drawing commands (e.g., a portion or path) contribute to each tile of a canvas, all possible contributions by a drawing command to the left of the tile have to be resolved. In some implementations, possible contributions by a drawing command to the tile are represented by quadratic equation and may either positively or negatively contribute to the tile (e.g., color). For example, a possible contribution composed of a circle to the left of a tile does not contribute to the tile. In some implementations, to reduce the number of possible contributions to a tile, all possible contributions by a drawing command to the left of the tile are projected on to the left-side of the tile (e.g., vertical edge of a rectangular tile), to determine a vertical line or a plurality of vertical line segments representing actual contributions of the drawing command (e.g., contributing quadratic equations) and their positive contributions (e.g., colors). Then, ignore any possible contributions of the drawing command that are fully above, fully below, or fully to the right of the tile. For each actual contribution to the tile, determine a closed path representation of the actual contribution or contributions to the tile and the corresponding material visual properties. Then, determine the actual contributions for the remaining vector graphic drawing commands that form a vector graphic to be rendered. Finally, repeat the process for each of a plurality of tiles forming the canvas.

In some implementations, all possible contributions by a drawing command that are to the right of the tile could be evaluated. Alternatively, the direction used to resolve all possible contributions by a drawing command may be switched (e.g., depending the side that has the least complex possible contributions).

FIG. 12 is a flowchart illustrating an exemplary method of rendering a view of a vector graphic in a 3D environment. The vector graphic may be defined using a 2D canvas that may be displayed flat or warped within the 3D environment. The vector graphic may be defined based on vector graphics commands that define one or more paths (e.g., lines, curves, or shapes specified by mathematical formulas) and that specify the vector graphic's color, texture, etc. In some implementations, efficient rendering is achieved by using a first processor to determine which portions (e.g., paths or path segments (e.g., curves)) of the vector graphic are relevant to (e.g., contribute to) which 2D canvas regions (e.g., tiles). Then, a pixel (e.g., in the 2D canvas) is rendered in the 3D environment by using only the relevant vector graphic portions based on which region the pixel is within. In some implementations, the pre-processing stage reduces the number of curves used to represent the 2D vector graphic on the canvas (e.g., drawn in the 3D environment) by combining sub-portions of contributing portions that occur to the left of the tile. For example, a circle to the left of a tile fully encloses itself and contributes nothing to the tile.

Figure 14:
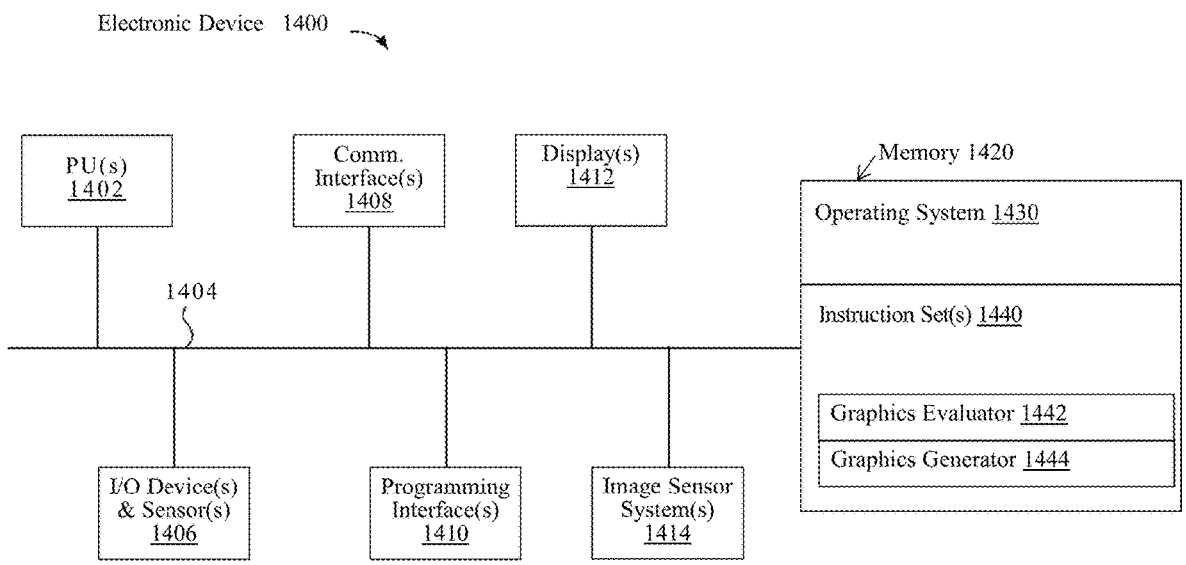
FIG. 14 illustrates an example electronic device in accordance with some implementations.

In some implementations, the method 1200 is performed by a device (e.g., electronic device 1320, 1300 of FIGS. 13 and 14). The method 1200 can be performed using an electronic device or by multiple devices in communication with one another. In some implementations, the method 1200 is performed by processing logic, including hardware, firmware, software, or a combination thereof. In some implementations, the method 1200 is performed by a processor executing code stored in a non-transitory computer-readable medium (e.g., a memory). In some implementations, the method 1200 is performed by an electronic device having a processor.

At block 1210, the method 1200 obtains a vector graphic including portions defined on a 2D canvas (see for example, block 1110).

At block 1220, the method 1200 identifies regions of the 2D canvas. In some implementations, the 2D canvas is divided into uniformly shaped tiles (see for example, block 1120).

At block 1230, the method 1200 generates data based on associating a plurality of the regions of the 2D canvas with representations of the portions of the vector graphic, the data identifying which representations of the portions of the vector graphic to use in rendering pixels in each of the regions of the 2D canvas. In some implementations, the data identifies one or more contributing portions of the portions of the vector graphic to use in rendering the pixels in each of the plurality of regions (e.g., tiles) of the 2D canvas. In some implementations, at least one of the representations is less complex than the represented portion of the vector graphic. For example, a relatively small edge line segment (e.g., a 1D line) along one edge of the tile may be used to represent the loops, twists, and other lengthy and complicated non-intersecting curves of the represented portion that are outside of the associated region (see for example, blocks 1130-1140). Further, using the representations that are simpler than the respective represented portions allows the GPU to render more efficiently.

In some implementations at block 1230, the data includes a state of each of the regions of the 2D canvas. In some implementations, the state is determined using a bounding box collision check. In some implementations, the state of each of the regions is determined by intersections of any of the portions of the vector graphic with an edge of the region. For example, edges of rectangular regions include a top horizontal edge, a right vertical edge, a bottom horizontal edge, and a left vertical edge. In some implementations, the state of the region is determined to be partial, empty, or filled. For example, partial regions include a color, a texture, an effect, or the like. As shown in FIG. 7, the tile 312 has a state of full, the tiles 312, 316 have a state of partial, and the tile 318 has a state of empty with respect to the shape 702.

In some implementations at block 1230, the data determines each of the portions that intersect an edge of a region contributes to the region. For example, each of the portions that intersect an edge of a region determines a path that crosses the region. In some implementations, the data for the contributing portion includes a path across the region that is divided into (e.g., represented by) one or more quadratic curves. Further, when the region has a contributing portion its state is not empty. In some implementations, a horizontal line/ray from the left edge of the canvas to a pixel is used to determine whether the pixel is filled or empty in the region. See for example, the pixel 524 in FIG. 5C. In some implementations, the data identifies visual properties (e.g., color) for each filled pixel in the region. In some implementations, each region of the regions is represented by a list of the data that includes closed paths across the region from contributing portions, and metadata to represent visual properties (e.g., color) for each filled pixel. See for example, the closed curve 890 used to draw pixels represented by the tile 316 of the canvas 804 for the shape 802. In some implementations, each region of their regions is represented by a look up table that includes a collection of closed paths that correspond to a range of pixels. In some implementations, a data structure included an array (compilation) of the lists for all the regions. In some implementations, the data structure represents the vector graphic.

At block 1240, the method 1200 provides the data to a processor for rendering the vector graphic. In some implementations, the processor is a GPU (see for example, paragraph [0053]). In some implementations, the GPU can efficiently determine how to render a pixel by assessing only the relevant vector graphic portions based on which region contains the pixel, without needing to assess other vector graphic portions. In some implementations, the processor uses the data to render the vector graphic in a 3D environment. For example, the processor performs a scanline conversion, wherein the scanline conversion queries which of the regions contains each pixel and executes a scanline conversion algorithm that determines fill, coverage, and color of the pixel based on any associated portions of the vector graphic. In some implementations, the processor provides a non-planar representation of the vector graphic by implementing 3D effects on the 2D vector graphic (e.g., warping, curling, folding, or mirroring the vector graphic).

In some implementations, blocks 1210, 1220, and 1230 are performed by a second processor (CPU). In some implementations, blocks 1210-1240 are performed by the same processor.

FIG. 13 illustrates an example operating environment 1300 in which electronic device 1320 is used in physical environment 1305. A physical environment refers to a physical world that people can interact with and/or sense without the aid of electronic systems. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the example of FIG. 13, the device 1320 is illustrated as a single device. Some implementations of the device 1320 are hand-held. For example, the device 1320 may be a mobile phone, a tablet, a laptop, and so forth. In some implementations, the device 1320 is worn by a user 1315. For example, the device 1320 may be a watch, a head-mounted device (HMD), and so forth. In some implementations, functions of the device 1320 are accomplished via two or more devices, for example additionally including an optional base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of the device 1320 may communicate with one another via wired or wireless communications.

FIG. 14 is a block diagram of an example device 1400. Device 1400 illustrates an exemplary device configuration for the device 1320. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 1400 includes one or more processing units 1402 (e.g., microprocessors, ASICs, FPGAs, GPUs, CPUs, processing cores, or the like), one or more input/output (I/O) devices and sensors 1406, one or more communication interfaces 1408 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 1410, one or more displays 1412, one or more interior or exterior facing sensor systems 1414, a memory 1420, and one or more communication buses 1404 for interconnecting these and various other components.

In some implementations, the one or more communication buses 1404 include circuitry that interconnects and controls communications between system components. In some implementations, the one or more I/O devices and sensors 1406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 1412 are configured to present content to the user. In some implementations, the one or more displays 1412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 1412 correspond to diffractive, reflective, polarized, holographic, etc. waveguide displays. For example, the electronic device 1400 may include a single display. In another example, the electronic device 1400 includes a display for each eye of the user.

In some implementations, the one or more interior or exterior facing sensor systems 1414 include an image capture device or array that captures image data or an audio capture device or array (e.g., microphone) that captures audio data. The one or more image sensor systems 1414 may include one or more RGB cameras (e.g., with a complimentary metal-oxide-semiconductor (CMOS) image sensor or a charge-coupled device (CCD) image sensor), monochrome cameras, IR cameras, or the like. In various implementations, the one or more image sensor systems 1414 further include an illumination source that emits light such as a flash. In some implementations, the one or more image sensor systems 1414 further include an on-camera image signal processor (ISP) configured to execute a plurality of processing operations on the image data.

The memory 1420 includes high-speed random-access memory, such as DRAM, SRAM, DDR RAM, or other random-access solid-state memory devices. In some implementations, the memory 1420 includes non-volatile memory, such as one or more magnetic disk storage devices, optical disk storage devices, flash memory devices, or other non-volatile solid-state storage devices. The memory 1420 optionally includes one or more storage devices remotely located from the one or more processing units 1402. The memory 1420 comprises a non-transitory computer readable storage medium.

In some implementations, the memory 1420 or the non-transitory computer readable storage medium of the memory 1420 stores an optional operating system 1430 and one or more instruction set(s) 1440. The operating system 1430 includes procedures for handling various basic system services and for performing hardware dependent tasks. In some implementations, the instruction set(s) 1440 include executable software defined by binary information stored in the form of electrical charge. In some implementations, the instruction set(s) 1440 are software that is executable by the one or more processing units 1402 to carry out one or more of the techniques described herein.

In some implementations, the instruction set(s) 1440 include a graphics evaluator 1442 that is executable by the processing unit(s) 1402 to determine which portions (e.g., paths or path segments) of a vector graphic are relevant to (e.g., contribute to) each of a plurality of regions sub-divided from a 2D canvas according to one or more of the techniques disclosed herein. In some implementations, the instruction set(s) 1440 include a graphics generator 1444 that is executable by the processing unit(s) 1402 to determine how to render a pixel of the 2D canvas by assessing only the relevant portions of the vector graphic based on which region the pixel is within according to one or more of the techniques disclosed herein.

Although the instruction set(s) 1440 are shown as residing on a single device, it should be understood that in other implementations, any combination of the elements may be located in separate computing devices. FIG. 14 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a first processor:
      obtaining a vector graphic comprising portions defined on a two-dimensional (2D) canvas;
      dividing the 2D canvas into tiles;
      identifying a subset of the portions outside of a first tile of the tiles on the 2D canvas;
      projecting the portions of the subset as a one-dimensional (1D) line span added to an edge of the first tile; and
      providing data for rendering the vector graphic, the data comprising the projected portions of the subset of the portions represented by the 1D line span.

2. The method of claim 1, further comprising reducing the projected portions based on determining an overlap of the projected portions on the edge.

3. The method of claim 1, further comprising representing a plurality of projected portions using a single line segment along the edge.

4. The method of claim 1, further comprising:
   adding spans to the projection portions for positive contributions of the subset of the portions; and
   subtracting spans from the projected portions for negative contribution of the subset of the portions.

5. The method of claim 4, further comprising merging or separating the spans that overlap.

6. The method of claim 1, further comprising determining a state of the tile, the state corresponding to whether the tile is empty, filled, or partially filled.

7. The method of claim 6, wherein the state is determined based on intersections of the portions of the vector graphic with the tile.

8. The method of claim 6, wherein the state is determined using a bounding box collision check.

9. The method of claim 1, wherein the data identifies a color or texture for each filled pixel in the tile.

10. The method of claim 1, wherein the first processor comprises a central processing unit (CPU), wherein in the data is provided to a graphics processing unit (GPU) configured to render the vector graphic based on the data in a in a three-dimensional (3D) environment.

11. The method of claim 10, wherein the GPU performs a scanline conversion that determines fill, coverage, and color of pixels based on the data.

12. The method of claim 1, wherein the one 1D line span comprises a vertical 1D line span added to the edge of the first tile.

13. The method of claim 1, wherein first tile comprises a first edge and a second edge perpendicular to the first edge.

14. The method of claim 13, wherein the 1D line span is added to the first edge.

15. The method of claim 13, wherein the 1D line span is added to the second edge.

16. A system comprising:
   memory; and
   one or more processors at a device coupled to the memory, wherein the memory comprises program instructions that, when executed on the one or more processors, cause the system to perform operations comprising:
      obtaining a vector graphic comprising portions defined on a two-dimensional (2D) canvas;
      dividing the 2D canvas into tiles;
      identifying a subset of the portions outside of a first tile of the tiles on the 2D canvas;
      projecting the portions of the subset as a 1D line span added to an edge of the first tile; and
      providing data for rendering the vector graphic, the data comprising the projected portions of the subset of the portions represented by the 1D line span.

17. The system of claim 16, the operations further comprising:
   adding spans to the projection portions for positive contributions of the subset of the portions; and
   subtracting spans from the projected portions for negative contribution of the subset of the portions.

18. The system of claim 17, the operations further comprising merging or separating the spans that overlap.

19. The method of claim 16, wherein a state of the tile is determined using a bounding box collision check.

20. A non-transitory computer-readable storage medium, storing program instructions executable via one or more processors to perform operations comprising:
   obtaining a vector graphic comprising portions defined on a two-dimensional (2D) canvas;
   dividing the 2D canvas into tiles;
   identifying a subset of the portions outside of a first tile of the tiles on the 2D canvas;
   projecting the portions of the subset onto as a 1D line span added to an edge of the first tile; and
   providing data for rendering the vector graphic, the data comprising the projected portions of the subset of the portions represented by the 1D line span.

* * * * *

UNITED STATES PATENT AND TRADEMARK OFFICE
CERTIFICATE OF CORRECTION

| | |
|---|---|
| PATENT NO. | : 12,039,645 B1 |
| APPLICATION NO. | : 17/683827 |
| DATED | : July 16, 2024 |
| INVENTOR(S) | : Jeremy G. Bridon |

It is certified that error appears in the above-identified patent and that said Letters Patent is hereby corrected as shown below:

In the Claims

Claim 10, Column 20, Lines 66-67 reads:
". . . based on the data in a in a three-dimensional . . ."
Should read:
-- . . . based on the data in a three-dimensional . . . --

Signed and Sealed this
Twentieth Day of August, 2024

Katherine Kelly Vidal
*Director of the United States Patent and Trademark Office*